July 7, 1942.     F. J. COSTELLO     2,288,889
VALVE
Filed May 12, 1939
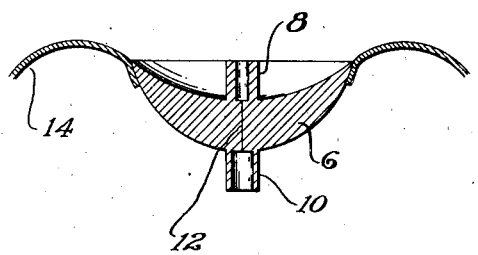
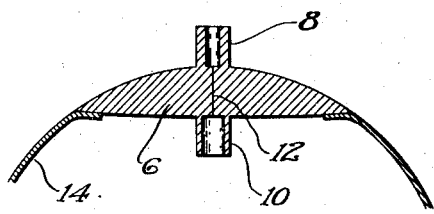
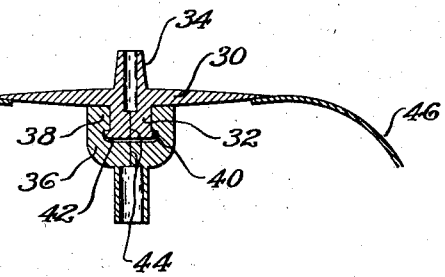
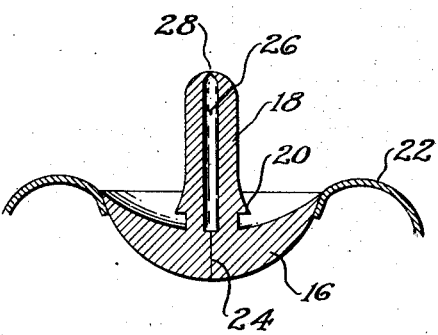
Witness
Paul F. Bryant
Inventor
Francis J. Costello
by his attorneys
Fish Hildreth Cary & Jenney Patented July 7, 1942

2,288,889

UNITED STATES PATENT OFFICE 2,288,889

VALVE

Francis J. Costello, Newton, Mass.

Application May 12, 1939, Serial No. 273,266

1 Claim. (Cl. 273—65)

The present invention relates to valves, and more particularly to self-closing pressure-retaining valves for football bladders, tires, and other containers holding fluid under pressure.

The principal object of the present invention is to provide a valve which will permit convenient application of pressure to the container, and which will provide a substantially perfect seal against loss of pressure.

With this object in view, the principal feature of the invention comprises a flexible and elastic valve device having a small aperture for the insertion of a hollow inflating needle, the valve being maintained in a distorted condition to compress the material thereof in the vicinity of the aperture and thus to seal the aperture tightly against loss of fluid after removal of the needle.

In the accompanying drawing Fig. 1 is a sectional elevation of one form of valve member according to the present invention, shown associated with a bladder in deflated condition; Fig. 2 is a sectional view of the valve member in inflated condition; Fig. 3 is a sectional view of a similar valve member particularly suited for vehicle tires; and Fig. 4 is a sectional elevation of a modified form of the invention.

The valve shown in Fig. 1 comprises a flexible and elastic cup-shaped member 6, preferably of rubber, having a thick central portion tapering to a relatively thin periphery. The valve is formed with an integral external tube 8 serving as a guide for the inflating needle, and a short integral internal tube 10 to protect the bladder itself from being punctured by the inflating needle. The entire member is readily molded and vulcanized in one piece according to usual rubber molding methods. After molding, a fine slit 12 is cut through the center of the body 6 by a small sharp-bladed knife, in order to permit introduction of the inflating needle.

In Fig. 1 the container to which the valve is applied is illustrated as a bladder 14. The bladder is formed with a hole smaller than the diameter of the valve, and is cemented to the valve around the periphery as shown in the drawing. The bladder is inflated by inserting a hollow inflating needle of the usual form through the slit 12, the needle being wetted to permit easy insertion. The needle is connected to a pump in the usual manner. As the bladder is inflated, the bladder 14 is distended, and this causes the valve body to be deflated or deformed until upon full inflation the contour indicated generally in Fig. 2 is reached, after which the needle is withdrawn. As shown in Fig. 2, the entire lower part of the body 6 is under compression due to the distortion of the rubber, and the needle opening 12 is tightly closed against escape of the air. In this case the distortion of the valve body is caused by the distortion of the bladder itself under the action of the internal air pressure.

It will be understood that when the bladder of Fig. 2 is used in a football, for example, it will be enclosed within the usual pigskin cover. The tube 8 passes through a hole in the cover and is cut off flush therewith.

In Fig. 3 is illustrated a form of the invention in which the valve member is initially distorted by forcing it to conform to a rigid member. As here shown, the device is used as a tire valve and the distortion of the valve body is accomplished by forcing it to conform to the contour of the rim. The valve itself is similar to the construction of Figs. 1 and 2 and comprises a body 16 having an external tube 18 adapted to protrude upwardly through the rim. The tube has a bead 20 which is adapted to pass through a hole in the rim to hold the valve in place. The tire or tube 22, which constitutes the fluid pressure container, is attached to the valve body 16 by cementing, as in the case of the bladder shown in Fig. 1. The valve body is provided with a small central inflating slit 24. The tube 18 has a relatively large guide opening 26 above the slit 24 and at the top the opening 26 converges to a small hole 28 to prevent entrance of dirt. On mounting the tire, the tube 18 is pulled through a hole in the rim so that the valve body is pre-distorted against the rim, and thereafter the tire is inflated by inserting the hollow inflating needle through the opening 24. The device may be used in conjunction with a fluid container of any kind, the valve body being pre-distorted by compelling it to assume a shape determined by a rigid member.

The construction shown in Fig. 4, which may likewise be applied to bladders, tires and other fluid containers under pressure, is similar to the constructions previously described in that it consists of a distorted elastic body to seal the internal pressure, and it has the additional advantage of providing a double seal against loss of pressure. The valve comprises two separately molded parts, namely, an upper part having a circular base portion 30 with a depending central button or projection 32 and an external needle guiding tube 34, and a lower body or cap member 36 having an annular portion 38 surrounding the button 32. The original internal diameter of the portion 38 is slightly less than the external diameter of the button. The lower part of the button 32 is formed with a flange 40 which underlies the annular portion 38 and is received in a space 42 of the lower body member. These two parts having been separately molded and vulcanized are assembled as shown in Fig. 4, this being accomplished by spreading the lower body member and forcing it over the button 32. A central slit 44 is then cut through both members. When used as a valve for a football bladder, the bladder 46 is cemented to the base 30 near the peripheral edge of the latter.

Since the annular portion 38 of the inner body member 36 is of smaller diameter than the button, the body member is distorted in a manner to compress the bottom portion thereof to apply sealing pressure to the needle opening. The degree of distortion, although too small to show in the drawing, is nevertheless sufficient to afford an exceptionally tight seal against loss of pressure. Furthermore, since the opening passes through both the body 36 and the button 32, a double seal is provided which enhances the sealing properties of the valve.

Although the invention has been shown and described as embodied in sealing devices for inflatable containers, it will be understood that the invention is not thus limited but may be used for sealing a container of any type against loss of internal fluid pressure.

Having thus described the invention, I claim:

A self-sealing pressure retaining valve for an inflatable fluid container comprising a normally cup-shaped body of flexible material having a thick central portion and a relatively thin peripheral portion, a small needle receiving passage through the central portion, the body being adapted upon inflation of the container to be distorted to a generally convex shape conforming to the contour of the container, said distortion causing compression of the material and sealing of the passage, an integral thin walled tube exteriorly of the body providing a guide to the outer end of the needle passage, and an integral open-ended thin walled tube aligned with the needle passage at the inner end thereof for preventing contact of the container with the inflating needle.

FRANCIS J. COSTELLO.